(12) United States Patent
Birukov et al.

(10) Patent No.: US 7,820,779 B2
(45) Date of Patent: Oct. 26, 2010

(54) NANOSTRUCTURED HYBRID OLIGOMER COMPOSITION

(75) Inventors: Olga Birukov, Haifa (IL); Dmitry Beilin, Haifa (IL); Oleg Figovsky, Haifa (IL); Alexander Leykin, Haifa (IL); Leonid Shapovalov, Haifa (IL)

(73) Assignees: Polymate, Ltd. (IL); Nanotech Industries, Inc., Daly City, CA (US)

( * ) Notice: Subject to any disclaimer, the term of this patent is extended or adjusted under 35 U.S.C. 154(b) by 0 days.

(21) Appl. No.: 12/381,626

(22) Filed: Mar. 13, 2009

(65) Prior Publication Data
US 2010/0234497 A1    Sep. 16, 2010

(51) Int. Cl.
*C08G 64/00* (2006.01)
*C08G 63/02* (2006.01)

(52) U.S. Cl. .......... 528/196; 528/21; 528/23; 528/198; 528/271; 528/272

(58) Field of Classification Search .......... 528/21, 528/23, 196, 198, 271, 272
See application file for complete search history.

(56) References Cited

U.S. PATENT DOCUMENTS

| | | |
|---|---|---|
| 3,837,876 A | 9/1974 | Mayuzumi et al. |
| 3,961,977 A | 6/1976 | Koda et al. |
| 4,250,074 A | 2/1981 | Foscante et al. |
| 4,791,214 A | 12/1988 | Mori et al. |
| 5,001,210 A | 3/1991 | Coury et al. |
| 5,173,206 A | 12/1992 | Dickens, Jr. et al. |
| 5,296,307 A | 3/1994 | Bernstein |
| 5,314,980 A | 5/1994 | Morrison |
| 5,618,860 A | 4/1997 | Mowrer et al. |
| 5,804,616 A | 9/1998 | Mowrer et al. |
| 5,942,073 A | 8/1999 | Mowrer et al. |
| 6,713,586 B2 | 3/2004 | Greene |
| 7,459,515 B2 | 12/2008 | Gommans et al. |
| 2004/0077778 A1 | 4/2004 | Hazan et al. |
| 2005/0208312 A1 | 9/2005 | Hazan et al. |
| 2006/0115611 A1 | 6/2006 | Hazan et al. |
| 2006/0216508 A1* | 9/2006 | Denisyuk et al. ............ 428/402 |
| 2007/0135588 A1 | 6/2007 | Diakoumakos et al. |

OTHER PUBLICATIONS

Leno Mascia, R J. Heath, Vincent S. Y. Ng. Selective Repartition of In Situ Generated Silica Produced During the Evolution of an Epoxide Network from a Homogeneous Precursors Mixture and Effects on Properties. *Journal of Applied Polymer Science*, 2004, vol. 94, No. 3, p. 1279-1290.

P. Innocenzi, T. Kidchob, T. Yoko. Hybrid Organic-Inorganic Sol-Gel Materials Based on Epoxy-Amine Systems. *Journal of Sol-Gel Science and Technology*, 2005, vol. 35, No. 3, p. 225-235.

\* cited by examiner

*Primary Examiner*—Terressa M Boykin
(74) *Attorney, Agent, or Firm*—Urania Juang

(57) ABSTRACT

A nanostructured hybrid liquid oligomer composition including at least one epoxy-functional component (A), at least one cyclic carbonate component (B), at least one amine-functional component (C), and, optionally, at least one acrylate (methacrylate) functional component (D), wherein at least one epoxy, amine, or acrylate (methacrylate) component contains alkoxysilane units. The composition is highly curable at low temperatures (approximately 10 to 30° C.) with forming of nanostructure under the influence of atmospheric moisture and the forming of active, specific hydroxyl groups by reaction of cyclic carbonates with amine functionalities. According to the present invention, the cured composition has excellent strength-stress properties, adhesion to a variety of substrates, appearance, and resistance to weathering, abrasion, and solvents.

27 Claims, No Drawings

NANOSTRUCTURED HYBRID OLIGOMER COMPOSITION

FIELD OF THE INVENTION

The present invention relates to liquid amine-curable oligomer compositions that contain units of silanes and hydroxycarbamates. More specifically, the invention relates to liquid oligomer compositions of the aforementioned type, wherein oligomer compositions are formed from epoxy, cyclic carbonate, and an amine component without the use of an isocyanate intermediate; the invention also relates to some epoxy and/or amine components that contain units of silanes and/or siloxanes. The compositions may also include an acrylic component. In particular, the invention may find application in preparation of curable coating materials with improved properties.

BACKGROUND OF THE INVENTION

The concept of generating silica from alkoxysilanes by the sol-gel method within a macromolecular organic phase (in situ) is widely known in the art. The organic and inorganic components of these materials are present as co-continuous phases of a few nanometers in lateral dimensions (Leno Mascia, R J. Heath, and Vincent S. Y. Ng, "Selective Repartition of In Situ Generated Silica Produced During the Evolution of an Epoxide Network from a Homogeneous Precursors Mixture and Effects on Properties." *Journal of Applied Polymer Science*, 2004, Vol. 94, No. 3, pp. 1279 to 1290).

The synthesis of epoxy amine sol-gel organic-inorganic materials is sufficiently flexible to allow fabrication of a wide group of hybrids with different structures and properties, whose applications range from non-linear optics to adhesive and protective coatings (P. Innocenzi, T. Kidchob, and T. Yoko, "Hybrid Organic-Inorganic Sol-Gel Materials Based on Epoxy-Amine Systems." *Journal of Sol-Gel Science and Technology*, 2005, Vol. 35, No. 3, pp. 225 to 235).

Oligomer compositions that contain a mixture of certain alkylalkoxysilanes with amine and epoxy end groups are well known in the art. For example, U.S. Pat. No. 3,837,876 issued to Mayuzumi, et al. in 1974 describes compositions for adhesion purposes, which consist essentially of the reaction product of epoxyalkylalkoxysilane with aminoalkylalkoxysilane. Organosilicone compositions are used in the form of a blend with a sealant or a primer coating for improving the adhesion of such blends onto various surfaces or for adhesion of the sealant, itself, onto various surfaces, respectively.

A transparent and scratch-resistant coating composition that comprises a partially hydrolyzed carbon-functional silane derived from aminoalkylalkoxysilane and epoxyalkylalkoxysilane is described in U.S. Pat. No. 3,961,977 issued to H. Koda, et al, in 1976.

U.S. Pat. No. 4,791,214 issued to Mori, et al, in 1988 describes a bonding agent that comprises a reaction product or mixture of epoxyalkylalkoxysilane and polyamine in an approximately stoichiometrically equivalent amount. The bonding agent is used preferably as an essentially non-reactive additive to various resin compositions in an amount of 0.1 to 20 parts by weight (as solid) to 100 parts by weight of the resin composition in order to impart excellent adhesion to the resin composition, particularly excellent durability of adhesion. Synthetic resins used as the main ingredient of the resin composition include conventional polyester resins, epoxy resins, alkyd resins, amino-alkyd resins, and the like, and type of synthetic rubber include conventional polyurethane rubber, silicone rubber, polysulfide rubber, and the like.

U.S. Pat. No. 5,173,206 issued to Dickens, et al, in 1992 relates to an oxidation-resistant composition that is a binary or a ternary composition made from at least one amino-containing silane compound, such as aminosilane or polyaminosilane, or from at least one epoxy resin, epoxy silane compound, or all three such compounds.

U.S. Pat. No. 5,314,980 issued to Morrison in 1994 relates to a coating composition that comprises epoxy silane, an amine hardener that can react with epoxy silane to form a cross-linked coating, and a stabilizer that includes a sufficient amount of a metal component to delay cross-linking between the epoxy silane and the amine hardener.

U.S. Pat. No. 6,713,586 issued to Greene in 2004 describes an epoxy-functional organopolysiloxane coating composition that comprises epoxy-functional organopolysiloxane resin and a hardener. The epoxy-functional organopolysiloxane coating composition may optionally include pigments, a flow additive, and a catalyst. The epoxy-functional organopolysiloxane resin is preferably prepared by reacting silicone resin with a silane having at least one epoxy group per molecule. The coating composition cures through the crosslinking of epoxy groups of the resin to provide a coating that is weather- and corrosion resistant. The polysiloxane moieties in the resin render the cured coating resistant to both ultraviolet light and heat.

U.S. Pat. No. 42,500,074 issued to Foscante, et al, in 1981 relates to polymeric structures having interpenetrating matrices in a cured form, comprising an epoxy-polyamine network and a polysiloxane network. The physical and chemical properties of the interpenetrating network are improved over those of either polymeric component alone. The network can be prepared by simultaneously reacting epoxy resin having at least two oxirane groups with an amine curing agent, and having at least 0.1 equivalent of silane, water being substantially and uniformly distributed throughout the mixture in an amount sufficient to bring about substantial hydrolytic polycondensation of the silane to form a cross-linked interpenetrating polymer network. The amine-curing agent may be substituted wholly or in part with aminosilane. Sources of silane may include aminosilane and epoxysilane.

U.S. Pat. No. 5,618,860 issued to Mowrer, et al, in 1997 relates to a sprayable, trowelable epoxy-polysiloxane-based coating and flooring composition that exhibits excellent weatherability in sunlight and superior resistance to chemicals, corrosion, and impact after curing and that comprises the following: (a) a resin component that includes a non-aromatic epoxy resin having at least two 1,2-epoxy groups per molecule; polysiloxane, and organooxysilane; (b) a difunctional aminosilane hardener component; (c) an organotin catalyst; and (d) an aggregate or pigment component. Organic solvents and flow-modifying agents can be added to facilitate spray application. The resin component, hardener component, aggregate component, and desired catalysts are combined in the presence of a sufficient amount of water to promote the hydrolysis of polysiloxane and/or organooxysilane and the polycondensation of silanols produced by such hydrolysis. Aminosilane and epoxide resin react to form a cured linear epoxy polymer. Polysiloxane and/or organooxysilane undergo a hydrolysis reaction that produces silanol. Silanol undergoes polycondensation, thereby forming a linear epoxy-modified polysiloxane polymer.

U.S. Pat. No. 5,804,616 issued to Mowrer, et al, in 1998 describes an epoxy-polysiloxane polymer composition prepared by combining a resin component with a hardener component. The resin component comprises a non-aromatic epoxy-resin ingredient and a polysiloxane ingredient. The hardener component comprises amine and, optionally, an organotin catalyst. The composition can also include aggregates, pigments, and other additives, depending on the particular end use. The composition is prepared using a sufficient amount of water to promote hydrolysis of the polysiloxane and polycondensation of the silanols produced by such hydrolysis. In its cured form, the epoxy-polysiloxane composition exists as a uniformly dispersed arrangement of linear epoxy-chain fragments that are cross-linked with a continuous polysiloxane polymer chain, thereby forming a non-interpenetrating polymer network chemical structure that has substantial advantages over conventional epoxy systems. Protective coatings formed from such compositions exhibit excellent weatherability in sunlight and superior chemical and corrosion resistance after curing.

U.S. Pat. No. 5,942,073 issued to Mowrer, et al, in 1999 relates to an adhesive system that comprises a siloxane-modified adhesive component. The siloxane-modified adhesive component is prepared by combining epoxy resin with an organosilane ingredient, polysiloxane resin, amine hardener, organometallic catalyst, base catalyst, and any thickener and extender pigment.

U.S. Pat. No. 7,459,515 issued to Gommans, et al, in 2008 relates to fast-curing modified siloxane compositions that comprise the following: (1) an alkoxy- or silanol-functional silicone intermediate, (2) at least one amine-reactive ingredient selected from the group consisting of acetoacetate-functional ingredients, acrylate-functional ingredients, and mixtures thereof, (3) an epoxy-functional ingredient, (4) a curing agent selected from the group consisting of amines, aminosilanes, ketimines, aldimines and mixtures thereof, and (5) water. Other ingredients useful in forming fast-curing modified siloxane compositions of this invention include silanes, organometallic catalysts, solvents, pigments, fillers, and modifying agents. The above-identified ingredients are combined and react to form a fully cured protective film comprising a cross-linked enamine polysiloxane and/or an acrylate polysiloxane chemical structure in a reduced amount of time when compared with conventional epoxy siloxane compositions.

The so-formed epoxy polysiloxane composition provides improved properties of weatherability and chemical and corrosion resistance when compared with conventional nonsiloxane-containing epoxy resin compositions. While this epoxy siloxane coating composition provides improved performance properties, similar to the epoxy siloxane composition discussed above (U.S. Pat. Nos. 42,500,074, 5,618,860, 5,804,616, and 5,942,073), this composition is known to be somewhat brittle and therefore lacking the desired degree of impact, flexibility, and abrasion resistance for certain applications.

Therefore, it is desired that an epoxy siloxane composition be developed that is both capable of providing the desired properties of weatherability and corrosion and chemical resistance already associated with epoxy siloxane compositions, while also providing improved properties of impact flexibility, and abrasion resistance.

Also, in all cases described above, the compositions include mixtures of epoxy resins, amine hardeners, and functional silanes and/or polysiloxanes in the presence of water and in an amount sufficient to bring about substantial hydrolytic polycondensation of the silane.

Well known in the art are products of reactions of aminoalkyl alkoxyalkylsilanes and cyclic carbonates as intermediate for conventional polyurethanes production.

U.S. Pat. No. 5,001,210 issued to Coury, et al, in 1991 provides a method for producing polyurethane that incorporates a polydimethylsiloxane backbone. The method consists of reacting amino-terminated polydimethylsiloxane with a cyclic carbonate to produce urethane diol and reacting the urethane diol produced in the previous step with one or more diisocyanates or polyisocyanates to produce polyurethane.

U.S. Patent Application Publications No. 2004/0077778 published in 2004 (Hazan, et al), No. 2005/0208312 published in 2005 (Hazan, et al), and No. 2006/0115611 published in 2006 (Hazan, et al) describe a one-pack primer sealer composition containing a film-forming binder. The composition comprises (a) a silane-functional oligomer with a hydrolyzable group and an additional urethane group formed by first reacting an aminosilane monomer with a cyclic carbonate and then subsequently reacting the adduct formed with isocyanate or polyisocyanate; (b) a low-molecular-weight polyol compound or polymer; (c) a silane-coupling agent; and (c) a melamine formaldehyde crosslinking agent.

Also, it is well known to obtain nanocompositions with the help of nanofillers. U.S. Patent Application Publication No. 2007/0135588 published in 2007 (Diakoumakos, et al) describes quickly curable non-isocyanate-based polyurethane and polyurethane-epoxy network nanocomposite polymeric compositions comprising natural or modified nanoclay with either a monomer or oligomer bearing at least one cyclocarbonate group or a mixture of the latter with epoxy resin and a hardener, which is a monomer or oligomer, or mixtures thereof, bearing primary and/or secondary amino groups. However, nanosize fillers are very expensive. Also, their embedding into liquid oligomer compositions presents substantial technological difficulties.

OBJECTS AND SUMMARY OF THE INVENTION

An object of the present invention is to provide a nanostructured hybrid liquid oligomer composition by using active hydroxyl groups formed as a result of a reaction of cyclic carbonate with amine functionalities for activation of hydrolytic polycondensation of alkoxysilanes by means of atmospheric moisture, thus producing a nanostructure without a special procedure of water embedding or addition of nanofillers.

This invention relates to a nanostructured hybrid liquid oligomer composition including at least one epoxy-functional component (A), at least one cyclic carbonate component (B), and at least one amine-functional component (C), wherein at least one epoxy or amine component contains alkoxysilane units. The composition is highly curable at low temperatures (~10 to 30° C.), with the formation of a nanostructure under atmospheric moisture and the forming of specific active hydroxyl groups due to reaction of cyclic carbonates with amine functionalities (formulas I and II).

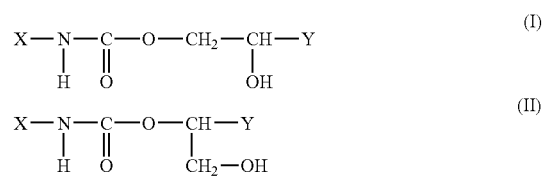

where X is amine-compound residue, and Y is cyclic-carbonate-compound residue.

The cured composition exhibits superior coating performance characteristics (pot-life/drying, strength-stress, bonding, appearance, resistance to weathering, abrasion, and solvents, and the like) in a well-balanced state.

DETAILED DESCRIPTION OF THE INVENTION

This invention relates to a nanostructured hybrid liquid oligomer composition that includes at least one epoxy-functional component (A), at least one cyclic carbonate component (B), and at least one amine-functional component (C), wherein at least one epoxy or amine component contains alkoxysilane units. The composition is highly curable at low temperatures (approximately 10 to 30° C.), with the formation of a nanostructure under the influence of atmospheric moisture and the forming of very active, specific hydroxyl groups due to the reaction of cyclic carbonates with amine functionalities (formulas I and II).

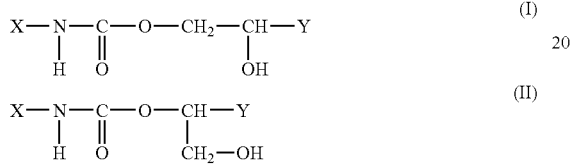

where X is amine-compound residue, and Y is cyclic-carbonate-compound residue.

The cured composition exhibits superior coating performance characteristics (pot-life/drying, strength-stress, bonding, appearance, resistance to weathering, abrasion and solvents, and the like) in a well-balanced state.

According to another aspect, the invention relates to a nanostructured hybrid oligomer composition, wherein at least one epoxy-functional component (A) and amine-functional component (C) with alkoxysilane units further contains polysiloxane units.

According to one more aspect, the invention relates to a nanostructured hybrid oligomer composition, wherein at least one epoxy-functional component (A) and amine-functional component (C) contains alkoxysilane units and at least one epoxy-functional component (A) and amine-functional component (C) contains both alkoxysilane units and polysiloxane units.

According to one more aspect, the invention relates to a nanostructured hybrid oligomer composition, further comprising a component (D) selected from an acrylate-functional component, a methacrylate-functional component, and a mixture thereof, wherein at least one epoxy-functional component (A), amine-functional component (C), and component (D) contains alkoxysilane units.

According to one more aspect, the invention relates to a nanostructured hybrid oligomer composition, further comprising a component (D) selected from an acrylate-functional component, a methacrylate-functional component, and a mixture thereof, wherein at least one epoxy-functional component (A) and amine-functional component (C) with alkoxysilane units further contains polysiloxanes units.

According to one more aspect, the invention relates to a nanostructured hybrid oligomer composition, including components (A), (B), (C), and (D) and further comprising at least one epoxy-functional component (A) and amine-functional component (C) that contains both alkoxysilane units and polysiloxanes units.

More specifically, according to the present invention, there is a nanostructured hybrid oligomer composition that contains an epoxy-functional component (A) with at least one terminal glycidyl group, a cyclic carbonate component (B) with at least one terminal five-member cyclic carbonate group, an amine-functional component (C) with at least one terminal primary amine group, and, optionally, an acrylate-(methacrylate) functional component (D) with at least one terminal acrylic (methacrylic) group.

According to one more aspect, the invention relates to a nanostructured hybrid oligomer composition, wherein component (D) contains a terminal group selected from a terminal acrylic group, a terminal methacrylic group, and a mixture thereof.

According to one more aspect, the invention relates to a nanostructured hybrid oligomer composition, wherein said epoxy-functional component (A) with at least one terminal glycidyl group is selected from the group consisting of:
diglycidyl ethers of bisphenol-A,
diglycidyl ethers of bisphenol-F,
hydrogenated diglycidyl ether of bisphenol-A,
polyglycidyl ethers of novolac resin with oxyrane functionality from 2.2 to 4,
hydrogenated polyglycidyl ethers of novolac resin,
di- or polyglycidyl ethers of aliphatic polyols,
di- or polyglycidyl ethers of cycloaliphatic polyols,
monofunctional-reactive diluents selected from aliphatic monoglycidyl ethers, aromatic monoglycidyl ethers, aliphatic monoglycidyl esters, aromatic monoglycidyl esters, and
alkoxysilane units containing epoxy compounds selected from monoglycidylalkoxysilanes and polyglycidylpolysiloxanes that are represented by the following general formula (III):

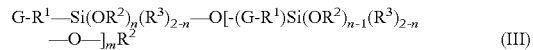

Formula (III) is a general formula of the epoxy silane component that includes both alkoxysilane units (—Si—O—R; for example, in Dynasylan® GLYMO, Evonik Industries, Germany, m=0, n=2, and $R^2$=methyl) and alkoxysilane+polysiloxane units (—Si—O—Si— for example, in Silres®, Wacker Chemical Corporation, Germany, HP 1000, m=2, n=1, $R^2$=methyl, $R^3$=phenyl).

In formula (III):
$R^1$ designates an aliphatic group having from 1 to 6 carbon atoms; hence, an ethyl or a propyl group is preferred; $R^2$ and $R^3$ moieties are univalent hydrocarbon groups where "n" is equal to 1 or preferably 2, and m≧0; that is, when "n" is 2, $R^3$ is nonexistent; when "m" is 0, the epoxy compound is monoglycidylalkoxysilane, and when m>0, the epoxy compound is polyglycidylpolysiloxane; and $R^2$ and $R^3$ independently represent hydrocarbon groups containing from 1 to 20 carbon atoms (e.g., aliphatic, aromatic, or combinations thereof) and preferably an alkyl having from 1 to 2 carbon atoms; G represents a glycidoxy group, and a mixture of the above components. The use of methyl and ethyl groups is preferred.

The cyclic carbonate component (B), which is used in the present invention, comprises at least one terminal five-member cyclic carbonate group (also named 1,3-dioxolan-2-one). Component (B) is selected from the group consisting of aliphatic monocyclocarbonate, polyoxyalkylene polycyclocarbonate, or a mixture of these components.

Polyoxyalkylene polycyclocarbonates can be produced in a known manner by reacting carbon dioxide with epoxy compounds (see, e.g., U.S. Pat. No. 5,175,231 issued to Rappoport, at al, in 1992, U.S. Pat. No. 5,340,889 issued to Crawford, et al, in 1994, and U.S. Pat. No. 7,232,877 issued to Figovsky, et al, in 2007). Epoxy compounds for production of polycyclocarbonates are preferably di- or polyglycidyl ethers based on hydrocarbon aliphatic di- or polyols, cycloaliphatic di- or polyols, and di- or polyoxyalkylene polyols.

The epoxy-equivalent weights of these epoxy compounds are preferably between 44 and 2000, and more preferably between 58 and 500. The epoxy-equivalent weight is the molecular weight divided by the number of epoxy groups.

Aliphatic monocyclocarbonates, which can be used as component (B), are conventional cyclic carbonates such as ethylene carbonate, propylene carbonate, or glycerin carbonate (products of Huntsman Corp., Tex., USA known under trademarks Jeffsol® EC, Jeffsol® PC, and Jeffsol® GC).

Monocyclocarbonates also can be produced in a known manner by reacting carbon dioxide with monoepoxy compounds, as described above.

Polyamines (C) with at least one terminal primary amine group suitable for the invention are selected from the group consisting of the following: aliphatic amines such as diethylenetriamine, triethylenetetramine, tetraethylenepentamine, pentaethylenehexamine, propylenediamine, dipropylenetriamine, 2,2,4- and/or 2,4,4-trimethylhexamethylenediamine, N,N-bis-(3-aminopropyl)-methylamine, N-aminoethylpiperazine, 1,4-bis-(3'-aminopropyl)-piperazine, N,N-bis-(3-aminopropyl)-ethylenediamine, neopentanediamine, 2-methyl-1,5-pentanediamine, 1,3-diaminopentane, hexamethylenediamine; cycloaliphatic amines such as 1,2- or 1,3-diaminocyclohexane, 1,4-diamino-3,6-diethylcyclohexane, 1,2-diamino-4-ethylcyclohexane, 1,4-diamino-3,6-diethyl-cyclohexane, 1-cyclohexyl-3,4-diaminocyclohexane, isophoronediamine, 4,4'-diaminodicyclohexyl-methane, and -propane, 2,2-bis-(4-aminocyclohexyl)-methane and -propane, 3,3'-dimethyl-4,4'-diaminodicyclohexyl-methane, 3-amino-1-cyclohexylaminopropane, 1,3- and 1,4-bis-(amininomethyl)-cyclohexan; polyoxyalkylenamines such as poly(oxypropylenediamine), poly(oxypropylenetriamine), poly(oxyethylenediamine), and poly(oxyethylenetriamine); araliphatic amines, in particular those in which aliphatic amine groups are present, are also suitable for the purposes of the invention and are exemplified by meta- and para-xylylenediamines; alkoxysilane units containing amine compounds selected from the aminoalkylalkoxysilanes and polyaminoalkylpolysiloxanes that are represented by the following general formula (IV):

$$Z\text{-}NH\text{-}R^1\text{-}Si(OR^2)_n(R^3)_{2-n}\text{-}O[\text{-}(Z\text{-}NH\text{-}R^1)Si(OR^2)_{n-1}(R^3)_{2-n}\text{-}O\text{-}]_mR^2 \quad (IV)$$

where $R^1$ is an aliphatic group having from 1 to 6 carbon atoms, $R^2$ and $R^3$ independently represent hydrocarbon groups containing from 1 to 20 carbon atoms (e.g., aliphatic, aromatic, or combinations thereof) and preferably an alkyl having from 1 to 2 carbon atoms; hence, methyl and ethyl groups are preferable.

Formula (IV) is a universal formula of the amine silane component that includes both alkoxysilane units (—Si—O—R; for example, in Dynasylan® AMMO, Evonik Industries, Germany, m=0, n=2, and $R^2$=methyl) and alkoxysilane+polysiloxane units (—Si—O—Si— for example, in the Silres®, Wacker Chemical Corporation, Germany, HP 2000, m=2, n=1, $R^2$=methyl, $R^3$=phenyl).

In formula (V), "n" equals 1 or 2, m≧0, and Z represents amine residue:

$$-[(CH_2)_2NH]_qH \quad (V)$$

where "q" is 0, 1, or 2; that is, when "n" is 2, $R^3$ is no-existent; when "m" is 0, the amine compound is aminoalkylalkoxysilane, and when m>0, the amine compound is polyaminoalkylpolysiloxane.

Amines with alkoxysilanes units related to the present invention are, e.g., aminoalkyl trialkoxysilanes, aminoalkyl alkyldialkoxysilanes, aminoalkyl dialkylalkoxysilanes, and precondensed amine alkoxysilanes.

The aforementioned commercially available aliphatic amines, cycloaliphatic amines, polyoxyalkylene amines, araliphatic amines, aminoalkylalkoxysilanes, polyaminoalkylpolysiloxanes, amine-epoxy adducts, amine-cyclocarbonate adducts, and amine-phenol adducts may be used individually or as a mixture.

The acrylate (methacrylate) component (D) with at least one terminal acrylic (methacrylic) group for the present invention is selected from the group consisting of an aliphatic polyol polyacrylate; acrylic silane, particularly, methacryloxyalkyl trialkoxysilane; or a mixture of the these components.

Commercially Available Epoxy resins (A) and Acrylate (D)

The following commercially available components are used in the subsequent description.

| | |
|---|---|
| DGEBA | diglycidyl ether of Bisphenol A (liquid 100% epoxy resin) |
| AGE | aliphatic glycidyl ether |
| 331 | DER ® 331 (Dow Chemical Company, MI, USA), liquid 100% epoxy resin (DGEBA) |
| 324 | DER ® 324 (Dow Chemical Company, MI, USA), liquid 100% epoxy resin (83% DGEBA + 17% $C_{12\text{-}14}$ AGE) |
| 431 | DEN ® 431 (Dow Chemical Company, MI, USA), liquid 100% epoxy-novolac resin |
| 1510 | Eponex ® 1510 (Hexion Specialty Chemicals, TX, USA), hydrogenated DGEBA |
| R14 | Polypox ® R14 (UPPC GmbH, Germany), diglycidyl ether of neopentyl glycol |
| M400 | M-cure ® 400 (Sartomer, PA, USA), aliphatic acrylate modifier for epoxy/amine systems |

Cyclic Carbonates (B)

| | |
|---|---|
| L 803 | Laprolat ® 803 (Macromer Co., Russia), polyoxypropylated trimethylol propane with cyclocarbonate terminal groups |
| PC | Jeffsol ® PC (Huntsman Corp., TX, USA), propylene carbonate |
| TCTMP | tricyclocarbonate of trimethylol propane (base of Polypox ® R20, UPPC GmbH, Germany) in accordance with U.S. Pat. 7232877, Ex. 11 |

Commercially Available Amine Hardeners and Components (C)

| | |
|---|---|
| MXDA | meta-xylylenediamine |
| IPDA | isophoronediamine |
| BA | benzyl alcohol |
| TMD | Vestamin® TMD 2,2,4-(2,4,4)-trimethyl-1,6-hexanediamine (Evonik Industries, Germany) |
| 2379 | Ancamine ® 2379 mixture IPDA and BA (Air Products, Inc., PA, USA) |
| 2432 | Ancamine ® 2432 mixture MXDA and BA (Air Products, Inc., PA, USA) |
| D400 | Jeffamine ® D400 polyoxypropylenediamine (Huntsman Corp., TX, USA) |

Commercially Available Silicones

Evonik Industries, Germany

| | | |
|---|---|---|
| AMMO | Dynasylan ® AMMO | 3-aminopropyl trimethoxysilane |
| AMEO | Dynasylan ® AMEO | 3-aminopropyl triethoxysilane |

-continued

| | | |
|---|---|---|
| 1505 | Dynasylan ® 1505 | 3-aminopropyl methyl diethoxysilane |
| DAMO | Dynasylan ® DAMO | N-(2-aminoethyl)-3-aminopropyl trimethoxysilane |
| 1411 | Dynasylan ® 1411 | N-(2-aminoethyl)-3-aminopropyl methyl dimethoxysilane |
| TRIAMO | Dynasylan ® TRIAMO | N-(2-aminoethyl)-N'-(2-aminoethyl)-3-aminopropyl trimethoxysilane |
| GLYMO | Dynasylan ® GLYMO | Glycidyloxypropyl trimethoxysilane |
| GLYEO | Dynasylan ® GLYEO | Glycidyloxypropyl triethoxysilane |
| MEMO | Dynasylan ® MEMO | 3-methacryloxypropyl trimethoxysilane |
| EF | Silikopon ® HP 2000 | Silicone epoxy hybrid resin |

Wacker Chemical Corporation, Germany

| | | |
|---|---|---|
| HP 1000 | Silres ® HP 1000 | Reactions products of polydimethylsiloxane/polyphenylsiloxane with GLYMO |
| HP 2000 | Silres ® HP 2000 | Co-polymers (2-aminoethyl)aminopropyl methoxydimethyl/phenyl siloxanes |

Nanostructured hybrid oligomer compositions may include conventional, commercially available additives such as pigments, fillers, antifoams, other additives for coatings, amine hardeners, accelerators, and so on.

NANOSTRUCTURED HYBRID LIQUID OLIGOMER COMPOSITIONS OF PRACTICAL EXAMPLES 1 TO 8

An epoxy component (A) including epoxy siloxane, a cyclic carbonate component (B), and an acrylate component (D), including acrylic siloxane, were carefully mixed at a temperature ranging from 20 to 70° C.

After cooling to a temperature in the range of 20 to 25° C., amine component (C), including amine siloxanes, was added, and the composition was mixed thoroughly at the aforementioned temperature.

Samples for testing according to standard methods were then prepared. Compositions obtained in Examples 1 to 8 are given in Table 1, and their properties are given in Table 2.

TABLE 1

Nanostructured Hybrid Oligomer Compositions

Examples (quantities in mass %)

| Component | Practical Examples | | | | | | | Comparative Example |
|---|---|---|---|---|---|---|---|---|
| | 1 | 2 | 3 | 4 | 5 | 6 | 7 | 8 |
| 324 | 62 | | | | 31 | | | 58 |
| 331 | | 35 | | | | 39 | | |
| 431 | | | 41 | | | | | |
| R14 | | | 12 | | | | | |
| 1510 | | | | 21 | | | | |
| M400 | | 6 | | | | 6 | | |
| PC | 0.5 | | 4 | | | 2 | | |
| L803 | | 14 | | 13 | 5 | | | |
| TCTMP | | | | | | | 18 | |
| GLYMO | 8.5 | 18 | | | | | | 17 |
| GLYEO | | | | | | 27 | | |
| HP 1000 | | | | 45 | | | | |
| EF | | | | | | | 62 | |
| MEMO | | | 20 | | | | | |
| 1411 | | | | 2 | | | | |
| 1505 | | | | | | 16 | | |
| AMMO | | | | | | | 8 | |
| AMEO | | 20 | | | | | | 18 |
| DAMO | 5 | | | | | | | |
| TRIAMO | | | 18 | | | | | |
| HP 2000 | | | | | 58 | | | |
| Sum of silicones | 13.5 | 38 | 38 | 47 | 58 | 43 | 70 | 35 |
| 2379 | 24 | | | | | | 12 | |
| 2432 | | | 19 | | | | | |
| TMD | | 7 | 5 | | | | | 7 |
| D400 | | | | 16 | | | | |
| Total | 100 | 100 | 100 | 100 | 100 | 100 | 100 | 100 |

Note:
In all cases above, the ratio of amino-group equivalents of amine hardeners (including amino-silicones) to the sum of epoxy-group equivalents, acrylate double-bond equivalents, and carbonate equivalents were essentially close to stoichiometry.

TABLE 2

Properties of Nanostructured Hybrid Oligomer Compositions

| | | After 7 day, 25° C. | | | | |
|---|---|---|---|---|---|---|
| Example | Pot life (min) | Dry-to-touch, (hours) | Impact resisance, punch 0.625 in., weight 4 lb, Al δ = 1 mm (ASTM D2794), N · m, ≧ | Elongation at break, % (ASTM D638M) | Resistance in acetone* | Taber abrasion** (ASTM D4060), 1000 cyc/1000 g, CS-17 wheel, mg |
| 1 | 50 | 3 | 3.5 | 4.2 | 10 | 37 |
| 2 | 30 | 2 | 6 | 6.8 | 10 | 28 |
| 3 | 25 | 2 | 5.5 | 5.4 | 10 | 32 |
| 4 | 35 | 5 | 4 | 6.2 | 10 | 20 |
| 5 | 30 | 2 | 4.5 | 4.0 | 10 | 35 |
| 6 | 90 | 4 | 4 | 4.7 | 10 | 38 |

TABLE 2-continued

Properties of Nanostructured Hybrid Oligomer Compositions

| | | | After 7 day, 25° C. | | | |
|---|---|---|---|---|---|---|
| Example | Pot life (min) | Dry-to-touch, (hours) | Impact resisance, punch 0.625 in., weight 4 lb, Al δ = 1 mm (ASTM D2794), N · m, ≧ | Elongation at break, % (ASTM D638M) | Resistance in acetone* | Taber abrasion** (ASTM D4060), 1000 cyc/1000 g, CS-17 wheel, mg |
| 7 | 60 | 4 | 4.5 | 5.0 | 10 | 18 |
| 8 comparative | 45 | 3 | 2 | 2.3 | 10 | 92 |

*Samples were immersed in acetone for 24 hours at 25° C. Key: 10 - no change.
**A test to determine resistance of plastic to abrasion. Resistance to abrasion is defined as the ability of a material to withstand mechanical action, such as rubbing, scraping, or erosion.

Examples 1 through 7 clearly show that nanostructured hybrid oligomers of the present invention have improved abrasion resistance and higher impact resistance and flexibility compared with the conventional epoxy resin siloxane-based materials in Comparative Example 8.

Although nanostructured hybrid oligomer compositions of this invention have been described in considerable detail with reference to certain preferred variations thereof, other variations are possible. Therefore, the spirit and scope of the appended claims should not be limited to the preferred variations described herein.

The invention claimed is:

1. A nanostructured hybrid oligomer composition comprising at least one epoxy-functional component (A); at least one cyclic carbonate component (B); and at least one amine-functional component (C), wherein at least one epoxy-functional component (A) and amine-functional component (C) contains alkoxysilane units, wherein the composition is highly curable within a temperature range of approximately 10 to 30° C., with formation of a nanostructure under atmospheric moisture and forming of specific active hydroxyl groups due to reaction of cyclic carbonates with amine functionalities (formulas I and II):

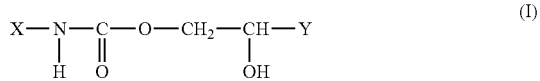

(I)

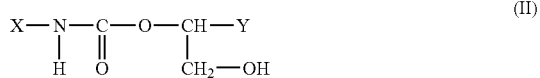

(II)

where X is an amine-compound residue, and Y is a cyclic-carbonate-compound residue.

2. The nanostructured hybrid oligomer composition of claim 1, wherein at least one epoxy-functional component (A) and amine-functional component (C) with alkoxysilane units further contains polysiloxane units.

3. The nanostructured hybrid oligomer composition of claim 1, wherein at least one epoxy-functional component (A) and amine-functional component (C) contains alkoxysilane units, and at least one epoxy-functional component (A) and amine-functional component (C) contains both alkoxysilane units and polysiloxane units.

4. The nanostructured hybrid oligomer composition of claim 1, further comprising a component (D) selected from an acrylate-functional component, a methacrylate-functional component, and a mixture thereof, wherein at least one epoxy-functional component (A), amine-functional component (C), and component (D) contains alkoxysilane units.

5. The nanostructured hybrid oligomer composition of claim 1, further comprising the component (D) selected from an acrylate-functional component, a methacrylate-functional component, and a mixture thereof, wherein at least one epoxy-functional component (A) and amine-functional component (C) with alkoxysilane units further contains polysiloxane units.

6. The nanostructured hybrid oligomer composition of claim 4, wherein at least one epoxy-functional component (A) and amine-functional component (C) contains both alkoxysilane units and polysiloxane units.

7. The nanostructured hybrid oligomer composition of claim 1, wherein the epoxy-functional component (A) contains at least one terminal glycidyl group, the cyclic carbonate component (B) contains at least one terminal five-member cyclic carbonate group, and the amine-functional component (C) contains at least one terminal primary amine group.

8. The nanostructured hybrid oligomer composition of claim 2, wherein the epoxy-functional component (A) contains at least one terminal glycidyl group, the cyclic carbonate component (B) contains at least one terminal five-member cyclic carbonate group, and the amine-functional component (C) contains at least one terminal primary amine group.

9. The nanostructured hybrid oligomer composition of claim 3, wherein the epoxy-functional component (A) contains at least one terminal glycidyl group, the cyclic carbonate component (B) contains at least one terminal five-member cyclic carbonate group, and the amine-functional component (C) contains at least one terminal primary amine group.

10. The nanostructured hybrid oligomer composition of claim 4, wherein the epoxy-functional component (A) contains at least one terminal glycidyl group, the cyclic carbonate component (B) contains at least one terminal five-member cyclic carbonate group, and the amine-functional component (C) contains at least one terminal primary amine group.

11. The nanostructured hybrid oligomer composition of claim 5, wherein the epoxy-functional component (A) contains at least one terminal glycidyl group, the cyclic carbonate component (B) contains at least one terminal five-member cyclic carbonate group, and the amine-functional component (C) contains at least one terminal primary amine group.

12. The nanostructured hybrid oligomer composition of claim 6, wherein the epoxy-functional component (A) contains at least one terminal glycidyl group, the cyclic carbonate component (B) contains at least one terminal five-member cyclic carbonate group, and the amine-functional component (C) contains at least one terminal primary amine group.

13. The nanostructured hybrid oligomer composition of claims 4, wherein the component (D) contains a terminal group selected from a terminal acrylic group, a terminal methacrylic group, and a mixture thereof.

14. The nanostructured hybrid oligomer composition of claim 5, wherein the epoxy-functional component (A) contains at least one terminal glycidyl group, the cyclic carbonate component (B) contains at least one terminal five-member cyclic carbonate group, and the amine-functional component (C) contains at least one terminal primary amine group.

15. The nanostructured hybrid oligomer composition of claim 6, wherein the epoxy-functional component (A) contains at least one terminal glycidyl group, the cyclic carbonate component (B) contains at least one terminal five-member cyclic carbonate group, and the amine-functional component (C) contains at least one terminal primary amine group.

16. The nanostructured hybrid oligomer composition of claim 7, wherein said epoxy-functional component (A) with at least one terminal glycidyl group is selected from the group consisting of the following compounds or their mixtures: diglycidyl ethers of bisphenol-A, diglycidyl ethers of bisphenol-F, hydrogenated diglycidyl ether of bisphenol-A, polyglycidyl ethers of novolac resin with oxyrane functionality from 2.2 to 4, hydrogenated polyglycidyl ethers of novolac resin, polyglycidyl ethers of aliphatic polyols, polyglycidyl ethers of cycloaliphatic polyols, monofunctional reactive diluents selected from the aliphatic monoglycidyl ethers, aromatic monoglycidyl ethers, aliphatic monoglycidyl esters, aromatic monoglycidyl esters, alkoxysilane units containing epoxy compounds selected from monoglycidylalkoxysilanes and polyglycidylpolysiloxanes that are represented by the following general formula:

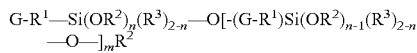

where $R^1$ an aliphatic group having from 1 to 6 carbon atoms, $R^2$ and $R^3$ independently represent aliphatic or aromatic hydrocarbon groups or combinations thereof with 1 to 20 carbon atoms; "n" is a number selected from 1 and 2; "m" satisfies the following condition: $m \geqq 0$; and G is the glycidoxy group.

17. The nanostructured hybrid oligomer composition of claim 13, wherein said epoxy-functional component (A) with at least one terminal glycidyl group is selected from the group consisting of the following compounds or their mixtures: diglycidyl ethers of bisphenol-A, diglycidyl ethers of bisphenol-F, hydrogenated diglycidyl ether of bisphenol-A, polyglycidyl ethers of novolac resin with oxyrane functionality from 2.2 to 4, hydrogenated polyglycidyl ethers of novolac resin, polyglycidyl ethers of aliphatic polyols, polyglycidyl ethers of cycloaliphatic polyols, monofunctional-reactive diluents selected from aliphatic monoglycidyl ethers, aromatic monoglycidyl ethers, aliphatic monoglycidyl esters, aromatic monoglycidyl esters, and alkoxysilane units containing epoxy compounds selected from monoglycidylalkoxysilanes and polyglycidylpolysiloxanes that are represented by the following general formula:

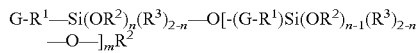

where $R^1$ is an aliphatic group having from 1 to 6 carbon atoms, $R^2$ and $R^3$ independently represent aliphatic or aromatic hydrocarbon groups or combinations thereof with 1 to 20 carbon atoms; "n" is a number selected from 1 and 2, "m" satisfies the following condition: $m \geqq 0$; and G is the glycidoxy group.

18. The nanostructured hybrid oligomer composition of claim 16, wherein said cyclic carbonate component (B) with at least one terminal five-member cyclic carbonate group is selected from the group consisting of aliphatic monocyclocarbonates, polyoxyalkylene polycyclocarbonates, or a mixture thereof.

19. The nanostructured hybrid oligomer composition of claim 17, wherein said cyclic carbonate component (B) with at least one terminal five-member cyclic carbonate group is selected from the group consisting of aliphatic monocyclocarbonates, polyoxyalkylene polycyclocarbonate, or a mixture of thereof.

20. The nanostructured hybrid oligomer composition of claim 18, wherein amine component (C) is selected from the group consisting of the following compounds or mixtures thereof: aliphatic amines, cycloaliphatic amines, polyoxyalkylene amines, araliphatic amines, amine-epoxy adducts, amine-cyclocarbonate adducts, amine-phenol adducts, and alkoxysilane units containing amine compounds selected from aminoalkylalkoxysilanes and polyaminoalkylpolysiloxanes that are represented by the following general formula:

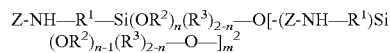

where $R^1$ is an aliphatic group having from 1 to 6 carbon atoms, $R^2$ and $R^3$ independently represent hydrocarbon groups containing from 1 to 20 carbon atoms and are selected from aliphatic groups, aromatic groups, or a combination thereof; "n" is a number selected from 1 and 2; "m" satisfies the following condition: $m \geqq 0$; and Z represents amine residue represented by the following formula:

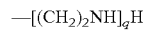

where "q" is selected from 0, 1, and 2.

21. The nanostructured hybrid oligomer composition of claim 19, wherein amine component (C) is selected from the group consisting of the following compounds or mixtures thereof: aliphatic amines, cycloaliphatic amines, polyoxyalkylene amines, araliphatic amines, amine-epoxy adducts, amine-cyclocarbonate adducts, amine-phenol adducts, and alkoxysilane units containing amine compounds selected from aminoalkylalkoxysilanes and polyaminoalkylpolysiloxanes that are represented by the following general formula:

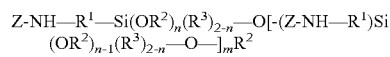

where $R^1$ is an aliphatic group having from 1 to 6 carbon atoms, $R^2$ and $R^3$ independently represent hydrocarbon groups containing from 1 to 20 carbon atoms and are selected from aliphatic groups and aromatic groups, or a combination thereof; "n" is a number selected from 1 and 2, "m" satisfies the following condition: $m \geqq 0$; and Z represents amine residue represented by the following formula:

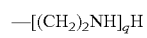

where q is selected from 0, 1, and 2.

22. The nanostructured hybrid oligomer composition of claim 21, wherein said acrylate(methacrylate) component (D) with at least one terminal acrylic (methacrylic) group is selected from the group consisting of aliphatic polyol polyacrylates, methacryloxyalkyl trialkoxysilane, or a mixture thereof.

23. The nanostructured hybrid oligomer composition of claim 20, wherein contents of said cyclic carbonate component (B) are 0.5 to 18 mass %.

24. The nanostructured hybrid oligomer composition of claim 22, wherein contents of said cyclic carbonate component (B) are 0.5 to 18 mass %.

25. The liquid oligomer composition of claim 24, wherein contents of said acrylate (methacrylate) component (D) are 6 to 20 mass %.

26. The nanostructured hybrid oligomer composition of claim 23, wherein the sum contents of said alkoxysilane functional components are 13.5 to 70 mass %.

27. The nanostructured hybrid oligomer composition of claim 25, wherein the sum contents of said alkoxysilane functional components are 13.5 to 70 mass %.

* * * * *